(12) United States Patent
Ponnuswamy

(10) Patent No.: US 11,537,454 B2
(45) Date of Patent: Dec. 27, 2022

(54) REDUCING WRITE OPERATIONS IN MIDDLEWARE

(71) Applicant: International Business Machines Corporation, Armonk, NY (US)

(72) Inventor: Umamahesh Ponnuswamy, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 370 days.

(21) Appl. No.: 16/737,967

(22) Filed: Jan. 9, 2020

(65) Prior Publication Data

US 2021/0216380 A1 Jul. 15, 2021

(51) Int. Cl.
*G06F 16/00* (2019.01)
*G06F 9/54* (2006.01)
*G06F 16/23* (2019.01)

(52) U.S. Cl.
CPC .......... *G06F 9/546* (2013.01); *G06F 16/2379* (2019.01); *G06F 2209/547* (2013.01)

(58) Field of Classification Search
CPC . G06F 9/546; G06F 16/2379; G06F 2209/547
See application file for complete search history.

(56) References Cited

U.S. PATENT DOCUMENTS

| | | | |
|---|---|---|---|
| 9,489,282 B2 | 11/2016 | Longobardi | |
| 10,025,628 B1* | 7/2018 | Evenson | G06F 16/00 |
| 2005/0193024 A1* | 9/2005 | Beyer | G06F 16/20 |
| 2010/0293268 A1* | 11/2010 | Jones | G06F 9/546 |
| | | | 709/224 |
| 2013/0179888 A1* | 7/2013 | Russell | G06F 9/5083 |
| | | | 718/101 |
| 2015/0143182 A1 | 5/2015 | Rajamanickam et al. | |
| 2015/0271256 A1* | 9/2015 | Pathak | H04L 47/6225 |
| | | | 709/223 |
| 2016/0357619 A1 | 12/2016 | Todd | |
| 2017/0048120 A1 | 2/2017 | Bartleywood | |

(Continued)

FOREIGN PATENT DOCUMENTS

CN 107094158 A * 8/2017 ......... H04L 63/1433

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Alexander Khong
(74) *Attorney, Agent, or Firm* — Daniel M. Yeates

(57) ABSTRACT

Disclosed is a computer-implemented method for reducing write operations in a message system. The method includes receiving, by a message system, a message from a producer, wherein the message includes a first flag, the first flag indicating the message should be written to a recovery log, and the message is configured to be sent to a consumer. The method also includes adding the message to a queue. The method further includes determining, at a first time, the consumer is not available. The method includes verifying, in response to the consumer not being available at the first time, a trigger is not met. The method also includes determining, at a second time, the consumer is available. The method also includes sending, in response to determining the consumer is available, the message to the consumer.

19 Claims, 5 Drawing Sheets

(56) References Cited

U.S. PATENT DOCUMENTS

| | | | |
|---|---|---|---|
| 2019/0057142 A1* | 2/2019 | Wang | G06F 16/273 |
| 2019/0121888 A1* | 4/2019 | Wei | G06F 16/2358 |
| 2019/0243702 A1* | 8/2019 | Shilane | G06F 11/0709 |
| 2019/0370088 A1* | 12/2019 | Chen | G06F 9/546 |
| 2021/0397605 A1* | 12/2021 | Dominguez | G06F 16/275 |

* cited by examiner

REDUCING WRITE OPERATIONS IN MIDDLEWARE

BACKGROUND

The present disclosure relates to message systems, and, more specifically, to reducing operations in middleware.

Message systems can manage information exchange among distributed applications. They can be a type of middleware application. The messages sent by a message generator (producer) are processed by the message system before they are sent to the consumer application. System crashes and other malfunctions may cause the loss of data in the message system. Many message systems include a recovery log, used to restore data after a crash.

SUMMARY

Disclosed is a computer-implemented method for reducing write operations in a message system. The method includes receiving, by a message system, a message from a producer, wherein the message includes a first flag, the first flag indicating the message should be written to a recovery log, and the message is configured to be sent to a consumer. The method also includes adding the message to a queue. The method further includes determining, at a first time, the consumer is not available. The method includes verifying, in response to the consumer not being available at the first time, a trigger is not met. The method also includes determining, at a second time, the consumer is available. The method also includes sending, in response to determining the consumer is available, the message to the consumer. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
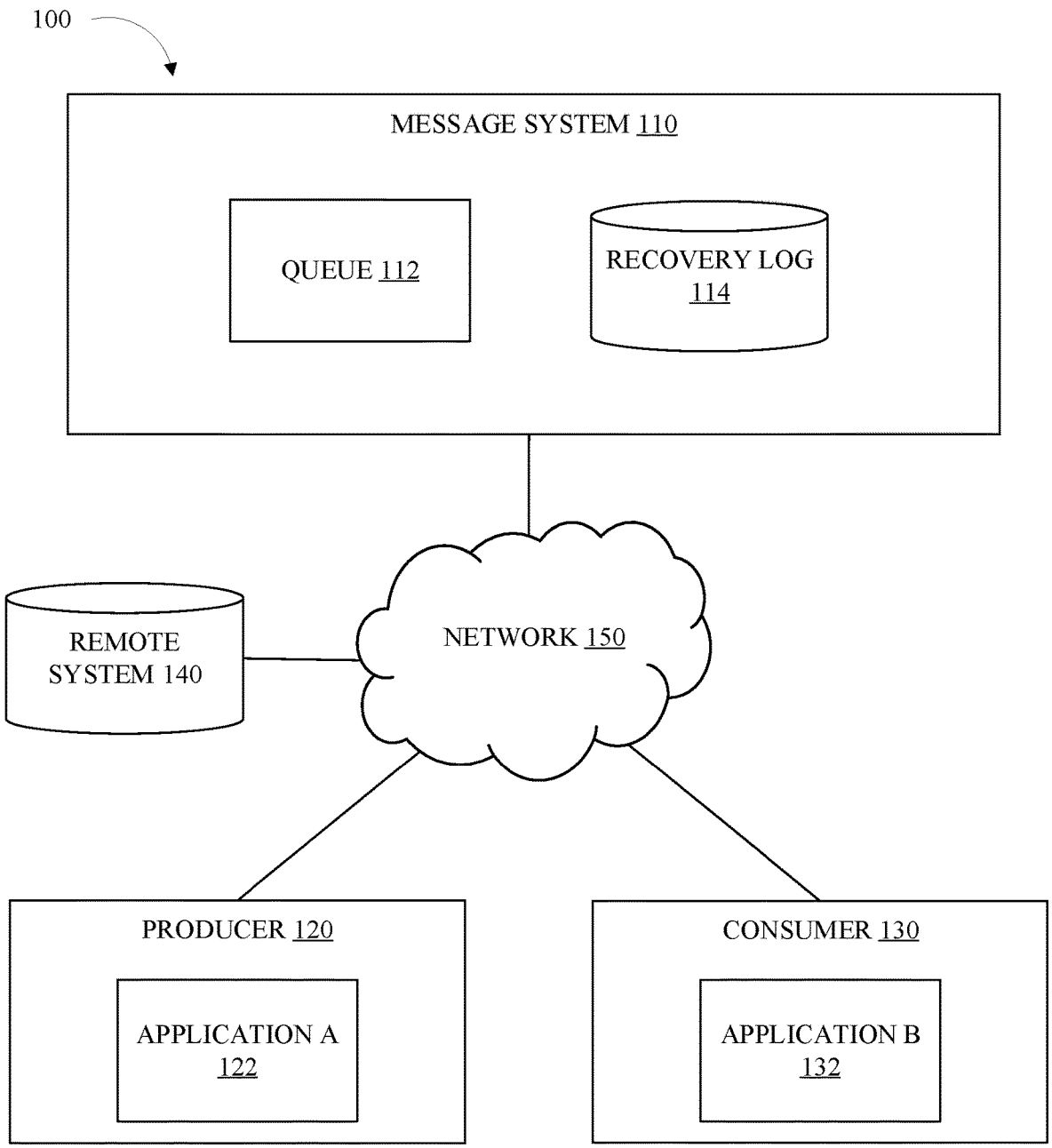
FIG. 1 illustrates a functional diagram of a computing environment suitable for operation of a message system, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to message systems, and more specifically, to reducing write operation in middleware applications. Aspects of the present disclosure may be better appreciated in light of the aforementioned applications.

Message systems can manage information exchange among distributed applications. The messages sent by the producers are processed by the message system before they are sent to the consumer application. System crashes and other malfunctions may cause the loss of data in the message system. Many message systems include a recovery log, used to restore data after a crash.

Messages, for purposes of this disclosure, may be any data being transferred between two or more applications over a communication medium and may be bounded so that the receiver of the message may determine its beginning and end. Messages may be generated (or created) by a producer and sent to (or received by) one or more consumers (or recipient applications).

The messages may be marked with a flag that includes data on how to process the message. The flag may be located in, e.g., a header of the message itself or in meta-data about the message that is sent along with the message. The data includes information regarding how to store the message, where to send the message, the message originator, and other similar data. In some embodiments, the message systems support both persistent and non-persistent message delivery. Messages marked persistent may be written into a persistent memory system (e.g., recovery log), so they may be restored in the event of an error.

In some embodiments, persistent messages are written to recovery logs before the changes are applied to the message store. This may be considered write ahead logging. Writing the messages to persistent storage media uses additional input/output (I/O) resources and may affect the message system performance.

In some embodiments, the messages travel to more than one message system. Each message may be written to the logs in each message system through which it passes. For example, messages may be written to the producer, the consumer and all the intermediate message systems between the source and the destination systems. Passing the messages between more than one intermediate system is called Multi-Hopping. Each additional write at any location utilizes additional I/O resources at each message system.

Embodiments of the present disclosure reduce I/O by selectively writing messages to persistent memory. Reducing I/O and reducing the number of writes to persistent storage may increase the overall efficiency of message systems. Embodiments of the present disclosure increase the efficiency of a message system by reducing writes to persistent storage.

In some embodiments, a message is received by the message system. The message may be received from a message producer (or producer). The message may then be stored in a message queue (or queue). In some embodiments, the message includes one or more flags. The flags may contain data on how the message system is to handle the message. For example, one flag may indicate the message should be backed up in persistent storage (e.g., a recovery log). Embodiments of the present disclosure reduce the number of messages to persistent storage, even when the flag indicates that the message should be backed up in persistent storage.

In some embodiments, write operations to persistent storage are reduced by delayed log writing. In delayed log writing, the writing of messages to recovery logs (persistent storage) is delayed with coordination between the message producer, the message consumer, and/or the message system. Delivery may be controlled by the message system. In some embodiments, the delay is based on a trigger. Once the trigger is met, the message may be written to persistent storage. In some embodiments, the trigger is based on a time since the message was received by the message system. In some embodiments, the trigger is based on availability of bandwidth. In some embodiments, the trigger is based on a clock (e.g., a timer). In some embodiments, the trigger is based on availability of the consumer. If the trigger is not met, the message may be delivered to the consumer without ever writing the data to persistent storage. This may save computing resources and thereby increase the overall efficiency of the message system without negatively affecting message traffic.

In some embodiments, the message is configured to pass through a series of message systems. The flags may indicate that the message should be written to persistent storage in each storage location. In some embodiments, writes to persistent storage are reduced by selective logging. In some embodiments, selective logging includes selecting a subset of the message systems in which to write the message to persistent storage. For example, the selection may be every other message system, it may be the first and the last message system, or any other combination. Each message system that foregoes writing the message to persistent memory saves computing resources.

In some embodiments, delayed log writing and selective writing are combined. For example, if the message is being passed through a plurality of message systems, the message may only be written to a selected message system if it meets the trigger condition.

The aforementioned advantages are example advantages, and embodiments exist that can contain all, some, or none of the aforementioned advantages while remaining within the spirit and scope of the present disclosure.

Referring now to various embodiments of the disclosure in more detail, FIG. 1 is a representation of a computing environment 100, that is capable of running a message system, in accordance with one or more embodiments of the present disclosure. Many modifications to the depicted environment may be made by those skilled in the art without departing from the scope of the disclosure as recited by the claims.

Computing environment 100 includes message system 110, producer 120, consumer 130, remote system 140, and network 150. Network 150 can be, for example, a telecommunications network, a local area network (LAN), a wide area network (WAN), such as the Internet, or a combination of the three, and can include wired, wireless, or fiber optic connections. Network 150 may include one or more wired and/or wireless networks that are capable of receiving and transmitting data, voice, and/or video signals, including multimedia signals that include voice, data, and video information. In general, network 150 may be any combination of connections and protocols that will support communications between message system 110, producer 120, consumer 130, remote system 140, and other computing devices (not shown) within computing environment 100.

Message system 110 can be a standalone computing device, a management server, a web server, a mobile computing device, or any other electronic device or computing system capable of receiving, sending, and processing data. In other embodiments, message system 110 can represent a server computing system utilizing multiple computers as a server system, such as in a cloud computing environment. In some embodiments, message system 110 represents a computing system utilizing clustered computers and components (e.g., database server computers, application server computers, etc.) that act as a single pool of seamless resources when accessed within computing environment 100.

In some embodiments, message system 110 is configured to receive and/or process messages. In some embodiments, message system 110 is configured to process (transform, manipulate, send, forward, etc.) the data in the message. Processing may include determining how to process the message. Further, it may include determining how to store the message. Determining how to process and/or store the messages may be based on the flags included in the message.

In some embodiments, message system 110 tracks each message. For example, it may know when each message was received, where the message was received from, etc. In some embodiments, message system 110 determines sets and monitors for triggers. A trigger is an event that may cause a result. The trigger may be based on a time, (difference between the time when a message is received, written to the queue, and/or processed). The trigger may be based on the number of messages received. For example, a trigger may be set when a message is received and activate when a certain number (e.g., five) of additional messages are received. The trigger may be based on the capacity of the system. For example, the trigger may be based on the queue turning over 10% (or any other value) of its capacity. In some embodiments, message system 110 includes queue 112 and recovery log 114.

Queue 112 can be any combination of hardware and software configured to store messages for processing. In some embodiments, queue 112 includes non-persistent (volatile) storage. In some embodiments, queue 112 stores messages after the message is received by message system 110. The messages may be stored in queue 112 based on a flag contained within the message. Queue 112 may store a plurality of messages. The messages may be stored until they are processed, deleted, and/or written into a persistent storage (e.g., recovery log 114).

Recovery log 114, can be any combination of hardware and software configured to backup messages in message system 110. In some embodiments, recovery log 114 includes persistent memory. Recovery log 114 may store the messages and associated data (e.g., unit of work, flags, metadata, etc.). Recovery log 114 may be utilized after a fault. The fault can be a system crash, loss of power, and/or other error that interrupt operations. The data may be used to restore message system 110 to the pre-error state.

Producer 120 can be of any of a number of different data processing systems including client computing devices, server computing devices, a tablet computer, laptop computer, telephone or other communication device, a personal digital assistant (PDA), or the like. In some illustrative examples, producer 120 may be a portable computing device that is configured with flash memory to provide non-volatile memory for storing operating system files and/or user-generated data. In various embodiments, producer 120 include software, hardware, and other necessary components to generate and send a message to message system 110. In some embodiments, the message is sent using an application programming interface (API).

In some embodiments, the message is part of a single unit of work (UOW). A UOW is a series of commands related to the message (e.g., a unit of execution, or a task). The UOW may be generated by producer 120 with the message. The UOW can be used to coordinate all the sub steps in processing a message. For example, the UOW can include the steps of putting the message into a queue, acknowledging receipt by consumer 130, and other steps.

Application A 122 can be any combination of hardware and/or software configured to generate messages. In some embodiments, application A 122 generates the UOW with the message. The application may attach one or more flags to the message. The flags indicate how to process the message. For example, one flag may indicate the message should be written to persistent data. In some embodiments, application A 122 is configured to operate in a cloud computing environment. The message may be data to be processed in a cloud computing system. Cloud computing is discussed in further detail in relation to FIGS. 4 and 5 below.

Consumer 130 can be any computing device configured to receive messages from message system 110. In some embodiments, consumer 130 is consistent with producer 120, except it is a destination for the message rather than the origination point.

Application B 132 is configured to receive and/or process messages. In some embodiments, application B 132 is consistent with application A 122, except it is a destination for the message rather than the origination point. In some embodiments, producer 120, consumer 130, application A 122 and/or application B 132 are located in the same computing device as message system 110.

Remote system 140 can be of any of a number of different data processing systems including client computing devices, server computing devices, a tablet computer, laptop computer, telephone or other communication device, a personal digital assistant (PDA), or the like. In some embodiments, remote system 140 is a second message system. In some embodiments, remote system 140 represents multiple systems. Remote system 140 may be a temporary destination for the message. For example, a message may be configured to pass through three message systems, and then to consumer 130. Each remote system (or message system 110) receives the message, processes the message per the instruction contained in the message, and then forwards the data to the next recipient. In various embodiments, remote system 140 can process the received messages per the same method/algorithm/instructions as message system 110. This may allow for reduction of I/O at each remote system.

In some embodiments, message system 110, producer 120 (or application A 122) and/or consumer 130 (or application B 132) are located in a single computing device. In these embodiments, data is transferred between the various components via intern process communications. This may include the standard data busses and communications methods and protocols for the computing device (see FIG. 3). Said differently, in some embodiments, network 150 includes inter-process communication within a single computing device.

Figure 2:
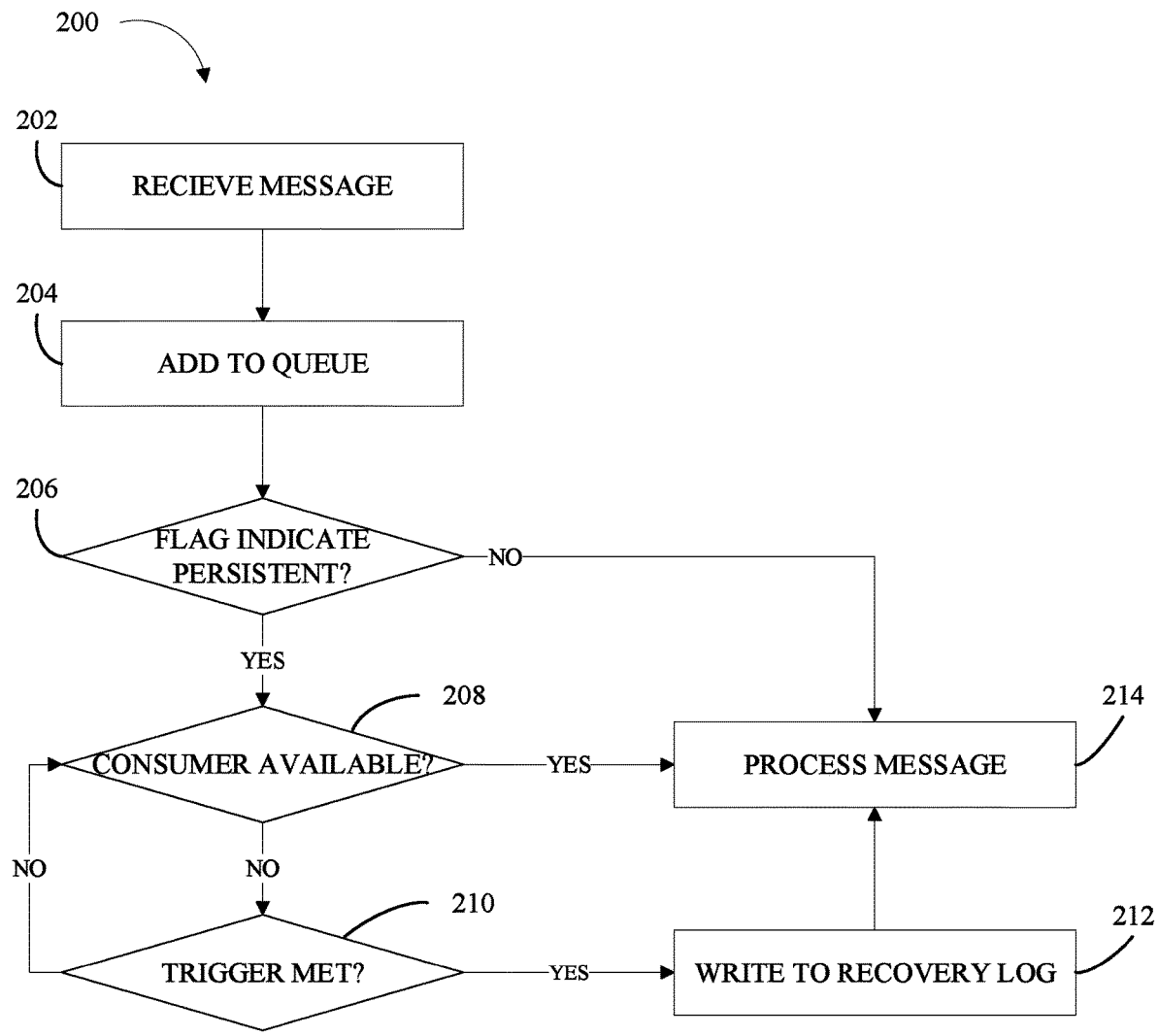
FIG. 2 illustrates a flow chart of an example method to reduce writing data to persistent memory in a message system in accordance with some embodiments of the present disclosure.

FIG. 2 depicts a flowchart of an example method, method 200, for reducing writes to persistent storage of a message system that can be performed in a computing environment (e.g., computing environment 100 and/or message system 110). One or more of the advantages and improvements described above can be realized by the method 200, consistent with various embodiments of the present disclosure.

Many modifications to the depicted method may be made by those skilled in the art without departing from the spirit and scope of the present disclosure. Method 200 can be implemented by one or more processors, message system 110, a computing device (e.g., producer 120, consumer 130, remote system 140), or a different combination of hardware and/or software. In various embodiments, the various operations of method 200 are performed by one or more of message system 110, producer 120, consumer 130, and remote system 140. However, method 200 will be described as being performed by message system 110.

At operation 202, message system 110 receives a message. In some embodiments, the message is received from producer 120. In some embodiments, the message is received from application A 122. The message may include one or more flags. In some embodiments the message includes instructions on how to process the message. The instructions may include where one or more destinations for the message. The destinations may include consumer 130, application B 132, and one or more remote applications 140.

In some embodiments, the message includes a put command. The put command may be stored as a flag. In some embodiments, the put command instructs message system 110 to write the message to persistent storage (e.g., recovery log 114). In some embodiments, the message includes a UOW.

At operation 204, message system 110 adds the message to queue 112. At operation 206 message system 110 determines if the message is marked persistent. In some embodiments, the message is marked persistent by the one or more flags. The message being marked persistent indicates the message should be written to recovery log 114. In some embodiments, the put command indicates the message should be backed up (e.g., written to persistent storage).

If it is determined the message is marked for persistent storage (206:YES), then message system 110 proceeds to operation 208. If it determined the message is not marked for persistent storage (206:NO), then message system 110 proceeds to operation 214.

At operation 208, message system 110 determines if consumer 130 is available. In some embodiments, consumer 130 is available if it has issued a get command. Consumer 130 may be the terminal point for the message, or an intermediate system of a series. In some embodiments, consumer 130 is available when it can accept the message. It may be based on bandwidth, on processing capacity, and/or other similar factors. This allows message system to bypass writing the message to persistent storage, despite the indication to do so.

If it is determined consumer 130 is available (208:YES), then message system 110 proceeds to operation 214. If it determined consumer 130 is not available (206:NO), then message system 110 proceeds to operation 210.

At operation 210 message system 110 determines if a trigger is met (or activated). In some embodiments, the trigger is a time (or wait interval). The trigger may be met if the message has been in queue 112 for a predetermined period of time.

In some embodiments, the trigger is based on queue 112. The trigger may be based on message throughput through queue 112. For example, the trigger may be when five additional messages are added to the queue after the message. In another example, the trigger may be after a number of other messages have been removed from the queue. The queue may be processed by any number of algorithms (e.g., first in first out, last in first out, etc.). In some embodiments, the trigger is based on the capacity of queue. For example, the trigger may be after 10% of the capacity has turned over. In some embodiments, there are multiple triggers (e.g., time and throughput). In some embodiments, the trigger is based on time, capacity, and or throughput.

If it is determined the trigger is met (210:YES), then message system 110 proceeds to operation 212. If it determined the trigger is not met (210:NO), then message system 110 returns to operation 208.

At operation 212, message system 110 writes the message to the recovery log. In some embodiments, writing to the recovery log is in response to meeting the trigger.

At operation 214, message system 110 processes the message. In some embodiments, processing the message includes sending the message to the next system. The next system may be consumer 130, and/or remote system 140. In some embodiments, processing includes completing the UOW.

In some embodiments, processing includes returning a put response to producer 120. The put response indicates the message was processed per the message instructions. In some embodiments, processing includes receiving a get response from consumer 130. The get response indicates, the message was received without error.

In some embodiments, message system 110 repeats method 200 for each message. In some embodiments, method 200 is performed multiple times for the same message. For example, if the message is to pass through a series of devices, the method 200 may be performed at one or more of the intermediate devices. For example, a message may be configured to be sent to two or more remote systems 140 in a predetermined sequence. The method 200 may be performed on each of the remote systems through which the message passes (e.g., selective logging).

Figure 3:
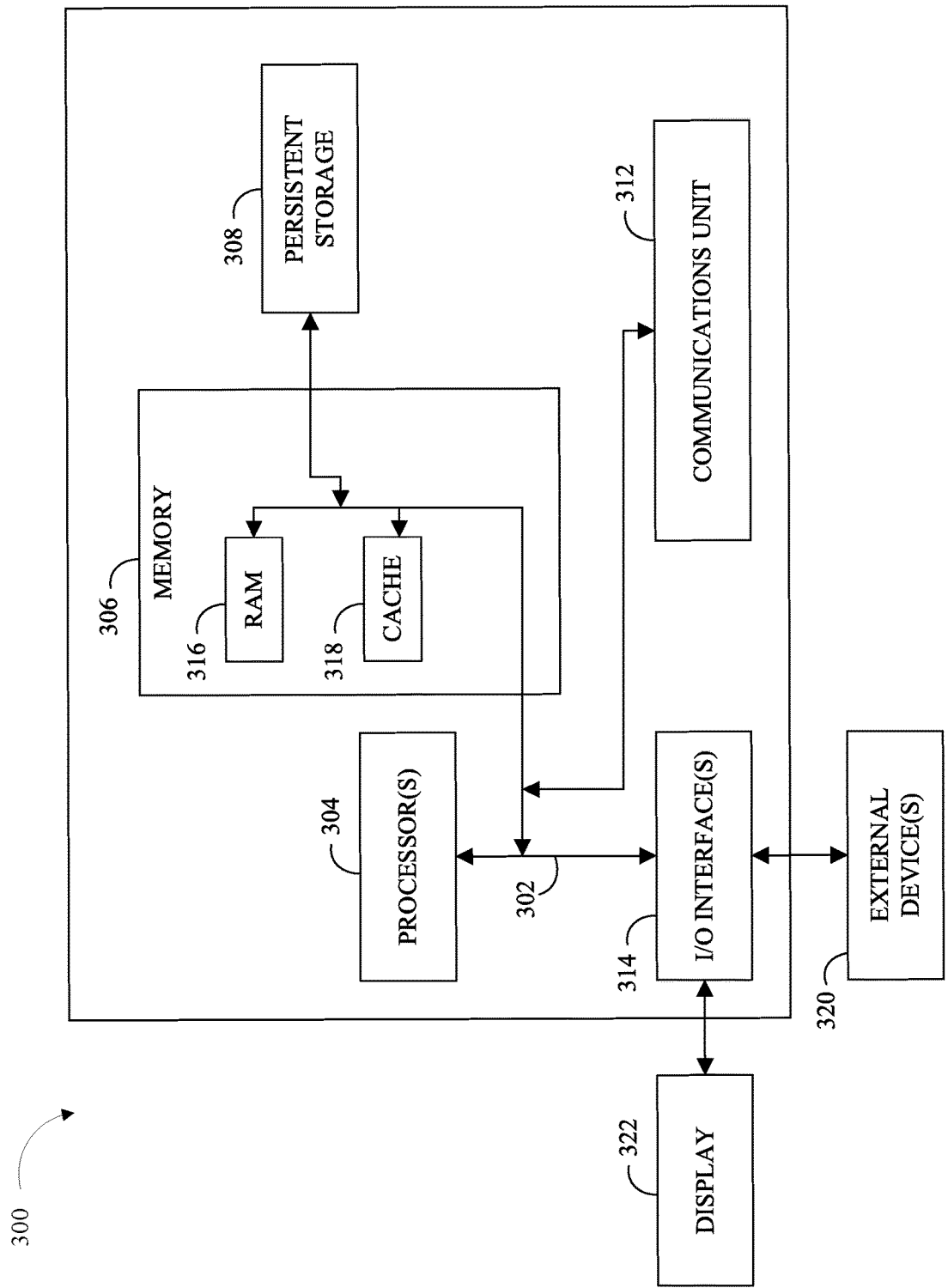
FIG. 3 illustrates a block diagram of an example computer system capable of operating a message system, in accordance with embodiments of the present disclosure.

FIG. 3 is a block diagram depicting components of a computer 300 suitable for operation of message system 110, in accordance with at least one embodiment of the invention. In an embodiment, computer 300 is representative of message system 110, producer 120, consumer 130, and remote system 140. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/ output (I/O) interface(s) 314. The communications fabric 302 may be implemented with any architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random access memory (RAM) 316 and a cache 318. In general, the memory 306 may comprise any suitable volatile or non-volatile one or more computer readable storage media.

Program instructions for message system 110, producer 120, consumer 130, and remote system 140 may be stored in the persistent storage 308, or more generally, any computer readable storage media, for execution by one or more of the respective computer processors 304 via one or more memories of the memory 306. The persistent storage 308 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
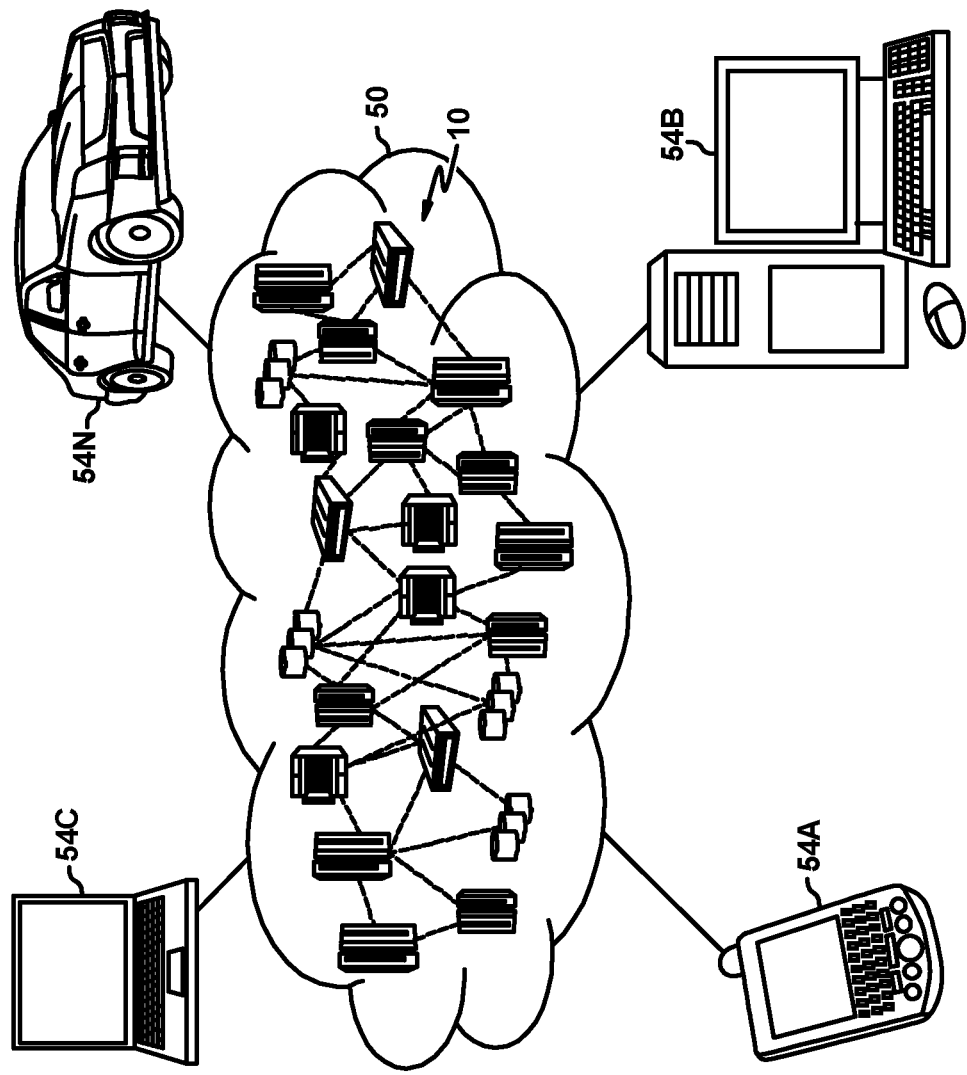
FIG. 4 depicts a cloud computing environment, in accordance with some embodiments of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 5:
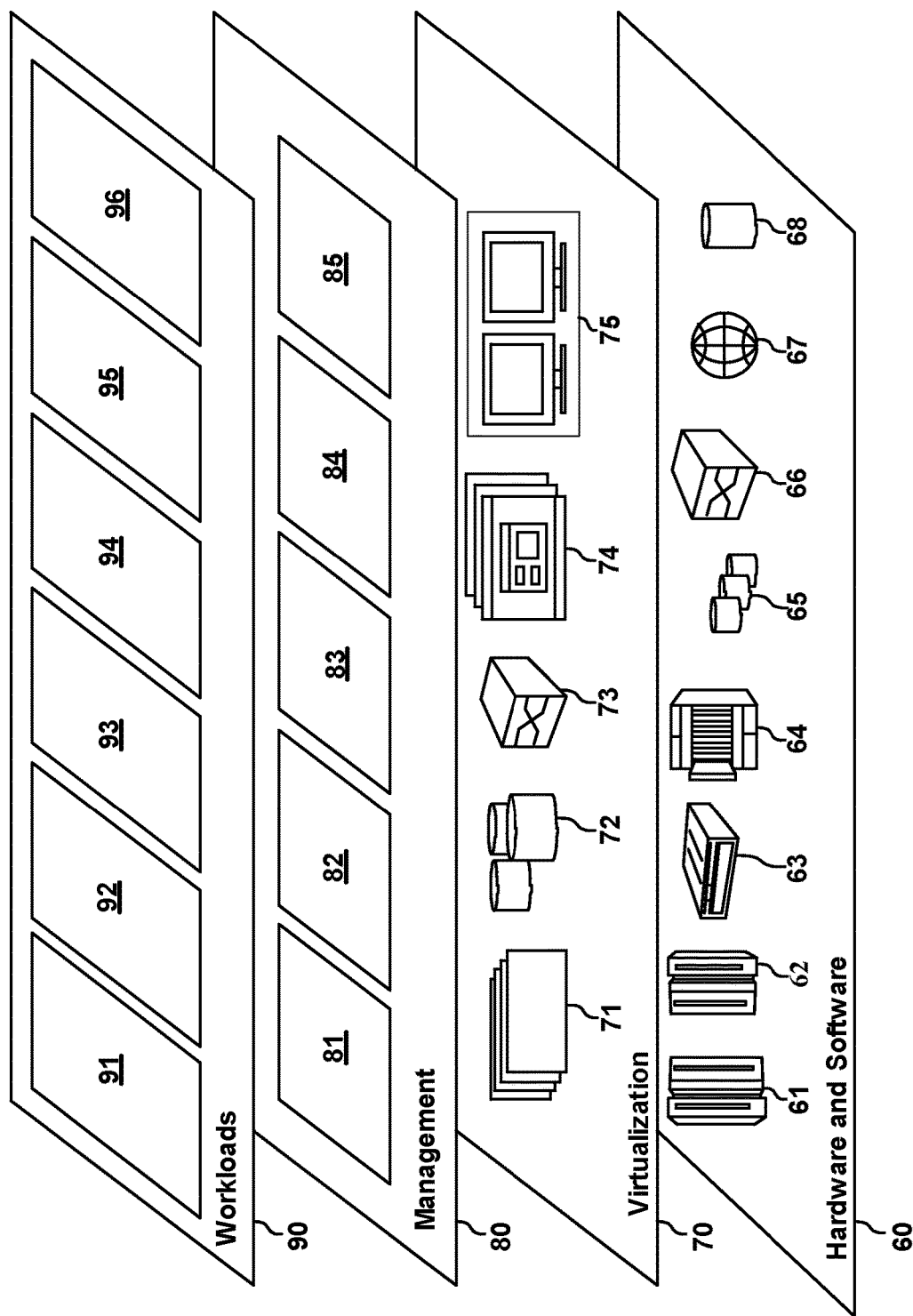
FIG. 5 depicts abstraction model layers, in accordance with some embodiments of the present disclosure.

Referring now to FIG. 5, a set of functional abstraction layers provided by cloud computing environment 50 (FIG. 4) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and message system management 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a message system, a message from a producer, wherein the message is configured to be sent to a first remote system and a second remote system in a predetermined sequence, the message includes a first flag and a second flag, where the first flag indicating the message should be written to a recovery log in a persistent storage and the second flag indicates the messages should be written to a remote recovery log in the first remote system and the second remote system, and the message is configured to be sent to a consumer;
   adding the message to a queue;
   determining, at a first time, the consumer is not available;
   verifying, in response to the consumer not being available at the first time, a trigger is not met;
   determining, at a second time, the consumer is available;
   sending, by the message system, in response to determining the consumer is available and without writing the message to the recovery log, the message to the consumer:
   sending, the message to the first remote system;
   determining the second remote system is available; and
   sending, in response to determining the second remote system is available, and prior to writing the message to the remote recovery log of the first remote system, the message to the second remote system.
2. The method of claim 1, wherein the first time is before the second time.
3. The method of claim 1, wherein the trigger is met when a predetermined period of time has passed after the message was added to the queue.
4. The method of claim 1, wherein the trigger is met when a predetermined number of other messages are added to the queue.
5. The method of claim 1, wherein determining the consumer is available in response to the consumer sending a get command to the message system.
6. The method of claim 1, wherein the flag includes a put command.
7. The method of claim 1, wherein the message is included in a unit of work (UOW).
8. The method of claim 1, further comprising:
   determining the trigger is met; and
   writing, in response to the trigger being met, the message to the recovery log, wherein the recovery log includes persistent storage.
9. The method of claim 1, wherein the method is performed by a message system, executing program instructions, and wherein the program instructions are downloaded from a remote data processing system.
10. A system comprising:
    a processor; and
    a computer-readable storage medium communicatively coupled to the processor and storing program instructions which, when executed by the processor, are configured to cause the processor to:
    receive, by a message system, a message from a producer, wherein the message includes a first flag and a second flag, the first flag indicating the message should be written to a recovery log in a first remote system and the second flag indicates the message should be written to a remote recovery log in a second remote system, and the message is configured to be sent to a consumer, and the message is configured to be sent to a first remote system and a second remote system in a predetermined sequence;
    add the message to a queue;
    determine, at a first time, the consumer is not available;
    verify, in response to the consumer not being available at the first time, a trigger is not met;
    determine, at a second time, the consumer is available; and
    send, by the message system, in response to determining the consumer is available and without writing the message to the recovery log, the message to the consumer;
    send the message to the first remote system;
    determine the second remote system is available; and
    send, in response to determining the second remote system is available, and prior to writing the message to the remote recovery log of the first remote system, the message to the second remote system.
11. The system of claim 10, wherein the first time is before the second time.
12. The system of claim 10, wherein the program instructions are further configured to cause the processor to write the message into the recovery log in response to meeting the trigger, and the trigger is met when a predetermined period of time has passed after the message was added to the queue.
13. The system of claim 10, wherein the program instructions are further configured to cause the processor to write the message into the recovery log in response to meeting the trigger, and the trigger is met when a predetermined number of other messages are added to the queue.
14. The system of claim 10, wherein the determination that the consumer is available is based on the consumer sending a get command to the message system.
15. A computer program product, the computer program product comprising a computer readable storage medium having program instructions embodied therewith, the program instructions executable by a processing unit to cause the processing unit to:
    receive, by a message system, a message from a producer, wherein the message includes a first flag and a second flag, the first flag indicating the message should be written to a recovery log and the second flag indicates the message should be written to a remote recovery log in a first remote system and a second remote system, the message is configured to be sent to a consumer, and the message is configured to be sent to the first remote system and the second remote system in a predetermined sequence;

add the message to a queue;

determine, at a first time, the consumer is not available;

verify, in response to the consumer not being available at the first time, a trigger is not met;

determine, at a second time, the consumer is available;

send, in response to determining the consumer is available, the message to the consumer send, the message to the first remote system;

determine the second remote system is available; and send, in response to determining the second remote system is available, and prior to writing the message to the remote recovery log of the first remote system, the message to the second remote system.

16. The computer program product of claim 15, wherein the first time is before the second time.

17. The computer program product of claim 15, wherein the trigger is met when a predetermined period of time has passed after the message was added to the queue.

18. The computer program product of claim 15, wherein the trigger is met when a predetermined number of other messages are added to the queue.

19. The method of claim 1 wherein the queue includes a volatile storage.

* * * * *